United States Patent
Segal et al.

(10) Patent No.: US 10,999,358 B2
(45) Date of Patent: May 4, 2021

(54) TRAFFIC MAPPING

(71) Applicant: Twitter, Inc., San Francisco, CA (US)

(72) Inventors: Todd Segal, Kirkland, WA (US); Nolan Daniel O'Brien, Henderson, NV (US); Hanson Ho, Vancouver (CA); Fei Xiong, Issaquah, WA (US); Brendan Boyd, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 157 days.

(21) Appl. No.: 16/177,037

(22) Filed: Oct. 31, 2018

(65) Prior Publication Data
US 2020/0137148 A1    Apr. 30, 2020

(51) Int. Cl.
  *H01L 29/08* (2006.01)
  *H04L 12/26* (2006.01)
  *H04L 29/08* (2006.01)

(52) U.S. Cl.
  CPC ........ *H04L 67/101* (2013.01); *H04L 43/0864* (2013.01); *H04L 43/12* (2013.01)

(58) Field of Classification Search
  None
  See application file for complete search history.

(56) References Cited

U.S. PATENT DOCUMENTS

| | | | | |
|---|---|---|---|---|
| 9,854,053 B1* | 12/2017 | Joseph | ................ | H04L 67/2842 |
| 2003/0191837 A1* | 10/2003 | Chen | ..................... | H04L 41/142 |
| | | | | 709/224 |
| 2014/0173051 A1 | 6/2014 | Sagayaraj et al. | | |
| 2017/0041355 A1 | 2/2017 | Ramamurthy et al. | | |
| 2017/0187768 A1* | 6/2017 | Huang | ................ | H04L 67/2842 |
| 2018/0192142 A1 | 7/2018 | Paul | | |
| 2019/0116195 A1 | 4/2019 | Boulton | | |
| 2019/0208270 A1 | 7/2019 | Bates et al. | | |

FOREIGN PATENT DOCUMENTS

JP          2012161098          8/2012

OTHER PUBLICATIONS

PCT International Search Report and Written Opinion in International Application No. PCT/US2019/059213, dated Jan. 30, 2020, 18 pages.

* cited by examiner

*Primary Examiner* — Joseph A Bednash
(74) *Attorney, Agent, or Firm* — Fish & Richardson P.C.

(57) ABSTRACT

Methods, systems, and apparatus, including computer programs encoded on computer storage media, for providing to user devices identifiers of edge servers from which to obtain content. One example system includes a traffic control service. The traffic control service is configured to receive polling requests from user devices. In response to a particular polling request, the traffic control service obtains aggregated data about the user devices and edge servers. The traffic control service selects, based on the aggregated data, a best edge server for the user device that sent the particular polling request. The traffic control service sends an identifier of the selected best edge server to the user device.

24 Claims, 4 Drawing Sheets

TRAFFIC MAPPING

BACKGROUND

This specification relates generally to load balancing on server-based systems.

SUMMARY

This specification describes technologies for identifying, for each user device using a content platform, a best ingress path for the user device to use to access the content platform.

An example system includes user devices, edge servers, which are servers that user devices use to access the content platform, an aggregation service, and a traffic control service. Each user device is associated with a network key. The number of network keys is less than the number of user devices. The network keys serve as identifiers of partitions of user devices, where the user devices in each partition have similar characteristics. Each user device is configured to send requests for content to an identified best edge server for the user device. The edge server provide the user devices access to the content platform.

The aggregation service obtains data about the edge servers from the user devices. In this specification, this data will be referred to as edge server data. The edge server data is labeled with device information about the user device that provided the edge server data, including the network key associated with the user device. The aggregation service aggregates the edge server data by network key and stores the aggregated data in memory on a physical server.

Each user device is configured to send probing requests to the best edge server for the user device and to one or more other edge servers. The user devices receive probing responses to the probing requests or note a lack of response. The user devices determine, for each received probing response, a round-trip time.

The traffic control service receives, from each user device, a polling request. In response, the traffic control service obtains from the aggregation service the edge server data aggregated by the network key that matches the network key associated with the user device. The traffic control service selects a best edge server for the user device based on the aggregated data. The traffic control service provides, to the user device, an identifier of the selected best edge server for the user device and identifiers of one or more other edge servers to which the user device should send future probing requests.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

The subject matter described in this specification can be implemented in particular embodiments so as to realize one or more of the following advantages. The system measures end-to-end latency between user devices and edge servers and uses the resulting latency data, along with other edge server data, to select a best edge server for each user device. Specifically, the traffic control service selects best edge servers for user devices by using up-to-date edge server data collected from multiple user devices and thus can quickly respond to changes in the distribution of requests from user devices and the ability of edge servers and the respective parts of the content platform that the edge servers use to respond to those requests.

The edge server data collected by the system from the user devices can be also used to detect and alert system management tools to problems that are specific to a particular group of users, particular types of devices, particular service providers, or particular transit peers.

Finally, the traffic control service can respond to a polling request with a best edge server even if the traffic control service cannot obtain edge server data from the particular user device making the polling request. Instead, having edge server data from user devices with the same network key is sufficient.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
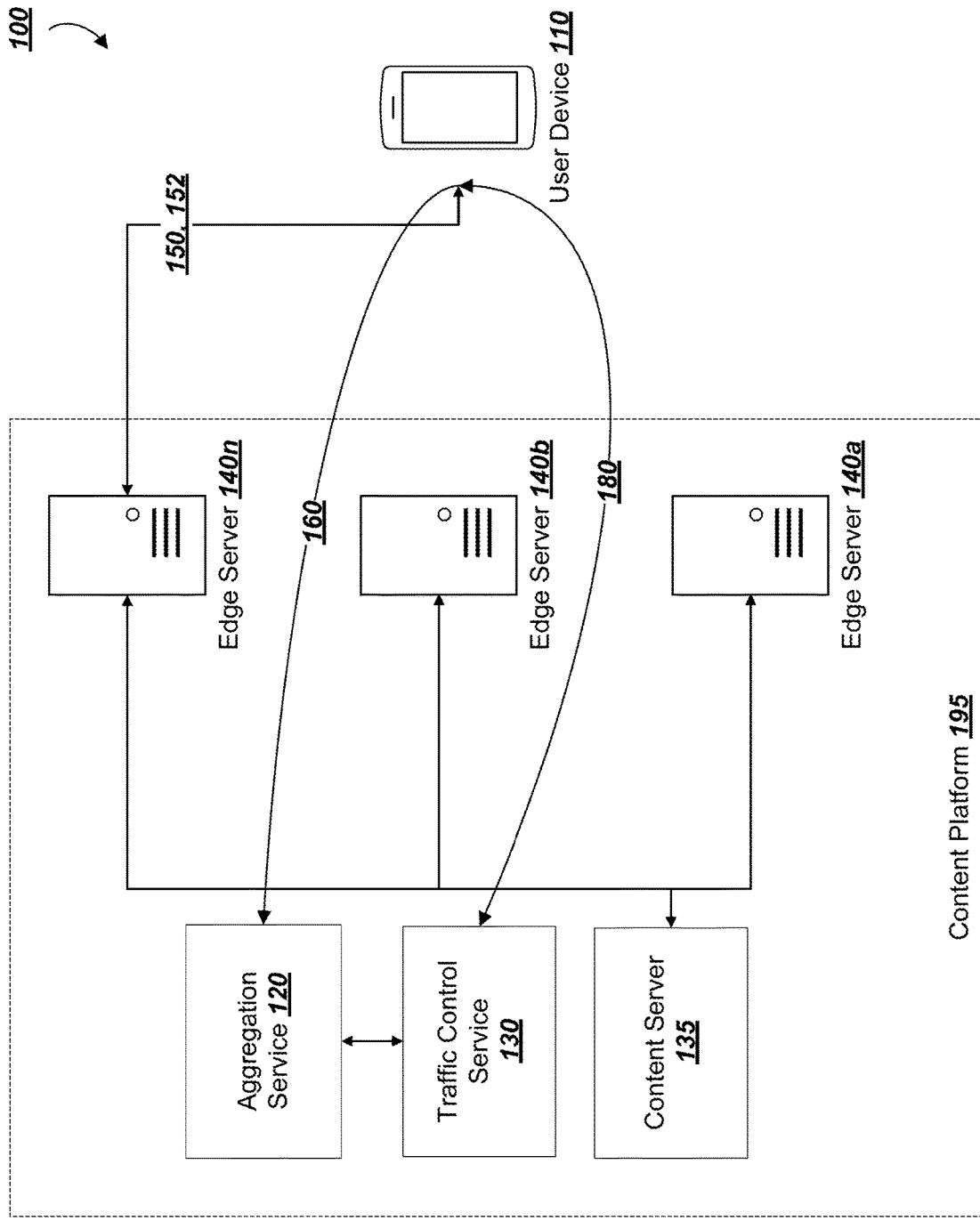
FIG. 1 is a diagram of an example system configured to determine best edge servers for user devices.

FIG. 1 is a diagram of an example system 100 configured to select an edge server as a respective best edge server for each respective user device in the system. The system includes user devices, e.g., a user device 110, and edge servers 140a-140n through which the user devices access a content platform 195. The content platform includes an aggregation service 120, a traffic control service 130, and a content server 135. Generally, the platform will contain multiple content servers, and the edge and content servers will be distributed geographically.

The user devices can be any Internet-connected computing devices, including laptop or desktop computers, electronic tablets, or mobile devices. The user devices can be connected to the Internet through a mobile network or through an Internet service provider. Although FIG. 1 depicts only a single user device, the system can support many user devices operating anywhere in the world.

Each user device is configured with client software that in operation communicates with the edge servers. On any particular user device, the client software may be or include JavaScript code or Java code. Or the client software may also be dedicated software, e.g., an installed app or installed application, that is designed to work specifically with the edge servers.

Each edge server is implemented on one or more computers, and generally on separate computers from the other edge servers. Generally, the edge servers include edge servers in multiple different geographical locations. The edge servers provide the client software access to content servers, allowing the client software to post content to and receive content from a content server. The content server can store and serve content of a website, application, communication platform, or the like. For example, the content server can store and serve content of an online social messaging platform, including messages and posts from users that use the online social messaging platform. In some cases, the edge servers are also content servers.

The edge servers respond to probing requests, e.g., a probing request 150 from the user device 110, by sending probing responses, e.g., a probing response 152. The user device determines a round-trip time for the probing request and probing response. If the user device does not receive the probing response, it notes that lack of response.

The user devices are configured to send edge server data 160, including calculated round-trip times, to the aggregation service. The user devices can send the edge server data in large batches, or they can send the edge server data incrementally as they calculate it. Each user device labels the edge server data that it sends to the aggregation service with the user device's network key. The aggregation service aggregates the edge server data by network key and stores the aggregated data. The aggregated data can be indexed by network key and edge server, allowing easy look-up. In some implementations, the aggregation service does some or all of the aggregation on the fly as aggregated data is requested.

Network keys can be determined in a number of ways. In some implementations, the network key for a particular user device is a tuple of the following elements: (i) a country code of the user device and (ii) an autonomous system number corresponding to an Internet Protocol (IP) address of the user device. In other implementations, the network key is an N-tuple of (i) a country code of the user device, (ii) an autonomous system number corresponding to an IP address of the user device, and (iii) the first three octets of the IP address of the user device. In other implementations, the network key is a tuple made up of two or more of a country code of the user device, an autonomous system number corresponding to an IP address of the user device, an identifier of a network egress path of the user device, an identifier of a geographic region where the user device is located, and an identifier of a connection type of the user device.

User devices associated with the same network key will generally have, for a given edge server, similar edge server data. The elements of the network key may be selected based on historical data to achieve this result.

One benefit of aggregating edge server data by network key is that such data is more comprehensive than data from a single user device, and the selection of a best edge server is more robust. Another benefit of aggregating edge server data by network key is that multiple user devices with a common network key can easily send probing requests collectively to a large set of edge servers, which would be impractical for a single user device.

The user devices in the system are configured to send polling requests 180 to the traffic control service. The frequency with which the user devices send polling requests can vary. For example, the user devices can send polling requests once every 5 minutes, 10 minutes, or 20 minutes. The user devices can send polling requests more or less frequently. In some implementations, the identifier of a best edge server that the traffic control service sends to a user device includes a "poll-after" value that specifies a time after which the user device should send a new polling request. The user devices may optionally be configured to send a polling request when they experience an increase in, or more than a threshold level of, latency from their respective best edge servers.

The traffic control service is configured to determine best edge servers for the user devices in the system based on the aggregated data computed by the aggregation service. By selecting best edge servers for the user devices in the system, the traffic control service is, in effect, selecting the best ingress paths from the user devices to the content platform. An example process by which the traffic control service selects best edge servers will be described in reference to FIG. 2.

The traffic control service is configured to send identifiers, e.g., IP addresses, of best edge servers to the user devices in the system. The user devices then make their requests for system content from the edge servers having those identifiers.

The traffic control service is also configured to send to each of the user devices in the system a list of other edge servers, i.e., edge server other than the one identified as the best edge server, to which the user devices should send probing requests. This process will be described in more detail in reference to FIG. 2.

Figure 2:
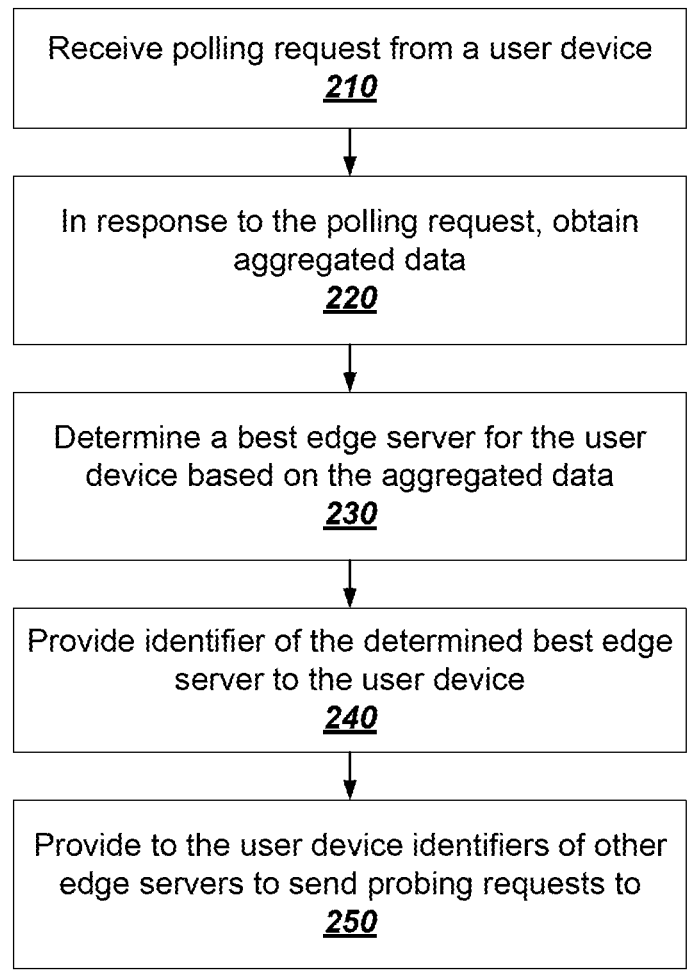
FIG. 2 is a flow chart of an example process for selecting best edge servers for user devices.

FIG. 2 is a flow chart of an example process for selecting, by the traffic control service, best edge servers for user devices in a system. This process will be described in reference to a single user device making a single polling request.

The traffic control service receives a polling request from a user device in the system (210).

In response to the polling request, the traffic control service obtains aggregated data from the aggregation service (220). For each polling request, the traffic control service obtains only the aggregated data that is labeled with the network key that is the same as the network key associated with the user device that sent the polling request. In some implementations, the traffic control service caches aggregated data for short periods of time and uses the cached data when available.

The aggregated data can include, for each edge server probed by a user device sharing the same network key, the following latency data: (i) a number of probing requests sent to the edge server by the user devices in a particular time frame, (ii) a probing response success rate of the edge server, i.e., a number of probing responses received by the user devices divided by a number of probing requests sent to the edge server by the user devices, (iii) an arithmetic mean or other average of the round-trip times of the edge server, (iv) and a standard deviation of the round-trip times of the edge server. The aggregated latency data is not limited to the above categories. Additionally, the aggregation service can store, and the traffic control service can obtain, edge server data other than latency data, e.g., availability data, throughput data, and cost data about the edge servers. The aggregation service would obtain this other edge server data directly from the edge servers.

Although the traffic control service and the aggregation service are referred to as separate services in this process, the functionality of both can be implemented in a single physical server.

After obtaining the aggregated data from the aggregation service, the traffic control service selects a particular edge server as a best edge server for the user device that sent the polling request (230). In some implementations, the traffic control service starts with a candidate set of edge servers for each of which the traffic control service has at least a threshold amount of data. The traffic control service removes from the candidate set edge servers that do not meet a minimum mean probing response success rate. This removes from consideration overloaded edge servers and edge servers that are not available. For each edge server that does meet the minimum probing response success rate, the traffic control service calculates a server score and ranks the edge servers according to their respective server scores. In some implementations, the server score is or is a function of the mean round-trip time of the edge server. In other implementations, the server score is or is a function of the mean round-trip time of the edge server plus the standard deviation of the round-trip times. In other implementations, the server score is or is a function of a high percentile, e.g., the 95th or 98th percentile, round-trip time for the edge server.

In some implementations, the traffic control service uses other types of edge server data, e.g., availability data, throughput data, or cost data, to determine a best edge server for a user device. Availability data is data that indicates whether an edge server is operational or non-operational at a particular time or data that indicates the average amount of time that an edge server is operational within a particular time period. Throughput data is data that indicates the bitrate of an edge server. And cost data is data that indicates the cost of accessing the content platform through one edge server as opposed to another. In contrast to latency data, availability data, throughput data, and cost data can be collected directly by the edge servers.

The traffic control service can use availability data, throughput data, and cost data as additional factors in selecting a best edge server for a user device. For example, if a particular edge server has low throughput or a high cost relative to other edge servers, the traffic control service can adjust, e.g., reduce, the server score of that particular edge server.

In some cases, the traffic control service may have an insufficient amount of latency data to make a robust determination of the best edge server for a particular user device. In such cases, the traffic control service can rely solely on availability, throughput, and cost data to make the determination.

In some implementations, the traffic control service provides the aggregated data to a host selection system that implements a trained machine learning model that has been trained to identify best edge servers for user devices. To train such a machine learning model, a training process receives, for example, aggregated data for a set of user devices. Each user device in the set is labeled with an actual best edge server that can be selected, for example, by statistical methods. If the edge server identified as the best edge server for a particular user device by the machine learning model does not correspond to the actual best edge server for the user device, then the training process updates parameters of the machine learning model. This process is repeated many times until the parameters of the machine learning model are such that the model identifies best edge servers with a particular accuracy. Once the machine learning model is trained, the final set of parameters can be used to determine best edge servers for user devices in the system.

The traffic control service provides an identifier of the selected best edge server to the user device (240). Thereafter, and until the user device sends a new polling request to the traffic control service, the user device sends content requests for system content to that selected best edge server.

The traffic control service also sends, to the user device, identifiers of other edge servers to which the user device should send future probing requests (250). In some implementations, these edge servers are the next N highest ranked edge servers for the user device. In some of these implementations, N is about 30 to 40.

In alternative implementations, the traffic control service conducts a virtual lottery to select the other edge servers. For example, the traffic control service can generate a ranked list of 25 edge servers. The traffic control service identifies the edge server with the highest rank as the best edge server. The remaining 24 edge servers participate in the virtual lottery in which the number of lottery tickets assigned to a particular edge server is inversely proportional to its rank. This ensures that edge servers more likely to be the best edge server, i.e., edge servers with higher ranks, are probed more often, while providing some randomness to ensure that the traffic control service can discover new best edge servers as edge server availability or routes change. The traffic control service pseudo-randomly selects lottery tickets until a predetermined number of edge servers have won the lottery. The winning edge servers are the edge servers to which the user device will send future probing requests.

The traffic control service can optionally ensure that every edge server is selected at least once for probing. For example, if a particular edge server is not selected in a predetermined number of consecutive lotteries, the traffic control service can override the results of the next virtual lottery to ensure that that edge server is among the edge servers to be probed by the user device.

Figure 3:
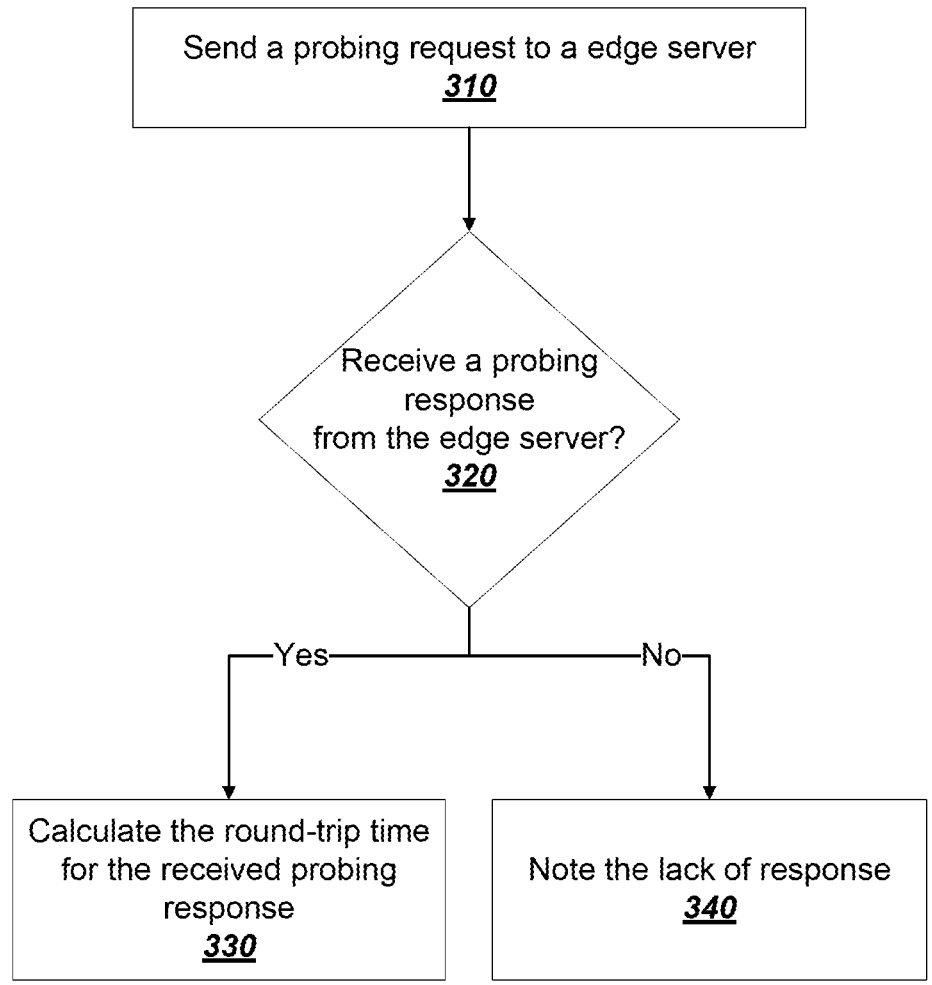
FIG. 3 is a flow chart of an example process for sending probing requests to edge servers.

FIG. 3 is a flow chart of an example process for sending a probing request to an edge server. The process will be described in reference to a single user device sending a single probing request, but each user device in the system sends multiple probing requests to multiple different edge servers, as has been described.

The user device sends a probing request to an edge server (310). The probing request can be a request for a test file, or it can be a request for content, or it can be combined with a request for content.

If the user device receives a probing response (320), the user device determines the round-trip time of the response (330). The round-trip time is an amount of time elapsed between a time the user device received the probing response and a time the user device sent the corresponding probing request. If the user device does not receive a probing response (320), that fact is noted and included in the edge server data that the user device sends to the aggregation service (340).

Figure 4:
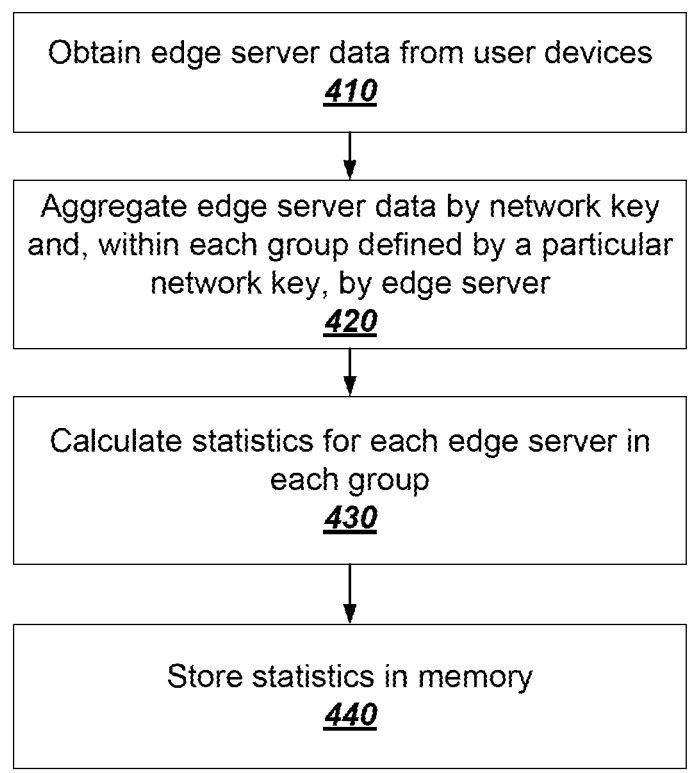
FIG. 4 is a flow chart of an example process for aggregating data.

FIG. 4 is a flow chart of an example process for aggregating edge server data sent by user devices in the system. This process will be described as being performed by the aggregation service described above.

The aggregation service obtains edge server data from the user devices in the system (410). The aggregation service aggregates the edge server data by network key and, within each group defined by a particular network key, by edge server (420). The aggregation service then calculates various statistics for each edge server in each group (430). The statistics can include a probing response success rate, a mean round-trip time, and the like. In this specification, these statistics are collectively referred to as aggregated data.

The aggregation service stores the aggregated data in memory on a physical server (440). The aggregation service indexes the aggregated data by network key and a unique edge server identifier. The edge server identifier can be, for example, an IP address of the edge server.

The aggregated data is recalculated regularly. In some implementations, it is recalculated at a predetermined frequency. In some of those implementations, the predetermined frequency is the polling request frequency or a multiple of the polling request frequency. If the recalculation frequency is the polling request frequency, recalculation will occur after a time during which the user devices will each have made, on average, one polling request. Regular recalculation ensures that the aggregated data is up-to-date and reflects current network conditions when user devices make new polling requests. In some implementations, the data is weighted to favor more recent data; in some implementations, the edge server data used to calculate aggregated data is limited to a predetermined recency window, which may be shorter than the recalculation frequency.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network.

Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a system comprising:
a plurality of user devices;
a plurality of edge servers configured to provide access to a content platform that serves content to the user devices, wherein each user device is associated with a network key, wherein the number of network keys is less than the number of user devices, and wherein each user device is configured to send requests for content to an edge server of the plurality of edge servers identified by data on the user device as a best edge server for the user device;
the user devices being configured to perform operations comprising:
sending probing requests to the best edge server for the user device and to one or more of the plurality of edge servers not identified as the best edge server,
receiving probing responses to the probing requests or noting a lack of response, and
determining, for each received probing response, a round-trip time, the round-trip time being an amount of time elapsed between a time the user device received the probing response and a time the user device sent the corresponding probing request, the determined round-trip times being edge server data; and
one or more services on the content platform configured to perform operations comprising:
obtaining from the user devices the edge server data, wherein the edge server data that is received from each user device is labeled with device information about the user device that provided the edge server data including the network key associated with the user device,
aggregating the edge server data by network key, and
in response to a polling request received from a user device:
selecting a best edge server for the user device based at least in part on the edge server data that had been aggregated by the network key that is the same as the network key associated with the user device, and
providing, to the user device, an identifier of the selected best edge server for the user device and identifiers of one or more other edge servers to which the user device should send future probing requests.

Embodiment 2 is the system of embodiment 1, wherein the network key associated with each user device comprises (i) a country code of the user device and (ii) an autonomous system number corresponding to an Internet Protocol (IP) address of the user device.

Embodiment 3 is the system of any of embodiments 1-2, wherein the network key associated with each user device comprises (i) a country code of the user device, (ii) an autonomous system number corresponding to an IP address of the user device, and (iii) the first three octets of the IP address of the user device.

Embodiment 4 is the system of any of embodiments 1-3, wherein the network key associated with each user device comprises a country code of the user device, an autonomous system number corresponding to an IP address of the user device, an identifier of a network egress path of the user device, an identifier of a geographic region where the user device is located, and an identifier of a connection type of the user device.

Embodiment 5 is the system of any of embodiments 1-4, wherein aggregating the edge server data by network key comprises, for each edge server:
determining a number of probing requests that were sent to the edge server by user devices associated with a same network key in a predetermined time window;
calculating a probing response success rate of the edge server, the probing response success rate being the number of probing responses received by user devices associated with the same network key divided by the number of probing requests sent to the edge server by the user devices; and
calculating a mean round-trip time of the edge server, the mean round-trip time of the edge server being a mean of the round-trip times determined for the probing responses sent by the edge server and received by the user devices associated with the same network key.

Embodiment 6 is the system of embodiment 5, wherein selecting a best edge server for the user device based on the aggregated data comprises:
providing the aggregated data and identifiers of edge servers to a machine learning model, wherein the machine learning model is trained to identify best edge servers; and
receiving, from the machine learning model, an identifier of the best edge server for the user device.

Embodiment 7 is the system of embodiment 5, wherein aggregating the edge server data by network key further comprises, for each edge server:
calculating a standard deviation of the round-trip times of the edge server to user devices associated with the same network key.

Embodiment 8 is the system of embodiment 7, wherein selecting a best edge server for the user device based on the aggregated data comprises:
calculating, for each edge server that meets a predetermined minimum probing response success rate, a respective server score; and
identifying, as the best edge server, the edge server with a best server score.

Embodiment 9 is the system of embodiment 8, wherein the server score corresponds to the mean round-trip-time of the edge server.

Embodiment 10 is the system of embodiment 8, wherein the server score corresponds to a sum of the mean round-trip-time of the edge server and the standard deviation of the round-trip times of the edge server.

Embodiment 11 is the system of embodiment 8, wherein the one or more other edge servers to which the user device should send future probing requests comprise a next 30 to 40 highest ranked edge servers based on the server scores of the edge servers.

Embodiment 12 is the system of embodiment 8, wherein the one or more other edge servers to which the user device should send future probing requests is determined by:
selecting edge servers from among the edge servers with a server score by a virtual raffle in which each edge server with a server score is assigned a number of raffle tickets that is higher for edge servers with better server scores than other edge servers.

Embodiment 13 is the system of embodiment 9, wherein the one or more services on the content platform are further configured to perform operations comprising:

obtaining throughput data from each of the plurality of edge servers, the throughput data comprising, for each edge server, a bit rate of the edge server; and adjusting the server scores of the edge servers based on the throughput data.

Embodiment 14 is the system of any of embodiments 1-13, wherein the one or more services comprise an aggregation service and a traffic control service, wherein:

the aggregation service is configured to perform operations comprising:
  obtaining from the user devices the edge server data collected by the user devices, wherein the edge server data that is received from each user device is labeled with device information about the user device that provided the edge server data including the network key associated with the user device, and
  aggregating the edge server data by network key,
the traffic control service is configured to perform operations comprising:
  in response to a polling request received from a user device:
    selecting a best edge server for the user device based on the edge server data that had been aggregated by the network key that is the same as the network key associated with the user device, and
    providing, to the user device, an identifier of the selected best edge server for the user device and identifiers of one or more other edge servers to which the user device should send future probing requests.

Embodiment 15 is a method that performs the operations of any one of embodiments 1-14.

Embodiment 16 is one or more computer storage media storing instructions that are operable, when executed by one or more computers, to cause the one or more computers to perform the operations of any one of embodiments 1-14.

While this specification contains many specific implementation details, these should not be construed as limitations on the scope of any invention or on the scope of what is being or may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising:
a plurality of user devices;
a plurality of edge servers configured to provide access to a content platform that serves content to the user devices, wherein each user device of the plurality of user devices is associated with a network key, wherein the number of network keys is less than the number of user devices, and wherein each user device is configured to send requests for content to an edge server of the plurality of edge servers identified by data on the user device as a best edge server for the user device;
each user device of the plurality of the user devices being configured to perform operations comprising:
  sending probing requests to the best edge server for the user device and to a plurality of other edge servers not identified as the best edge server, wherein the plurality of other edge servers were identified to the user device by the content platform in a previous response to a previous probing request from the user device,
  receiving probing responses to the probing requests or noting a lack of response, and
  determining, for each received probing response, a round-trip time, the round-trip time being an amount of time elapsed between a time the user device received the probing response and a time the user device sent the corresponding probing request, the determined round-trip times being edge server data; and
the content platform comprising one or more computers and one or more computer programs that, when executed by the one or more computers, cause the content platform to perform operations comprising:
  obtaining from the user devices the edge server data, wherein the edge server data that is received from each user device is labeled with device information about the user device that provided the edge server data including the network key associated with the user device,
  aggregating the edge server data by network key, including:
    determining a number of probing requests that were sent to the edge server by user devices associated with a same network key in a predetermined time window;
    calculating a probing response success rate of the edge server, the probing response success rate being the number of probing responses received by user devices associated with the same network key divided by the number of probing requests sent to the edge server by the user devices; and calculating a mean round-trip time of the edge server, the mean round-trip time of the edge server being a mean of the round-trip times determined for the probing responses sent by the edge server and received by the user devices associated with the same network key; and in response to a polling request received from a first user device:

selecting a best edge server for the first user device based at least in part on the edge server data that has been aggregated by the network key that is the same as the network key associated with the first user device, and providing, to the first user device, an identifier of the selected best edge server for the first user device and identifiers of a plurality of other edge servers to which the first user device should send future probing requests; and wherein the user devices of the plurality of user devices are each configured to request content from and post content to the content platform through the respective edge server that is the selected best edge server for the respective user device.

2. The system of claim 1, wherein the network key associated with each user device comprises (i) a country code of the user device and (ii) an autonomous system number corresponding to an Internet Protocol (IP) address of the user device.

3. The system of claim 1, wherein the network key associated with each user device comprises (i) a country code of the user device, (ii) an autonomous system number corresponding to an IP address of the user device, and (iii) the first three octets of the IP address of the user device.

4. The system of claim 1, wherein the network key associated with each user device comprises a country code of the user device, an autonomous system number corresponding to an IP address of the user device, an identifier of a network egress path of the user device, an identifier of a geographic region where the user device is located, and an identifier of a connection type of the user device.

5. The system of claim 1, wherein selecting a best edge server for the first user device based at least in part on the edge server data that has been aggregated by the network key that is the same as the network key associated with the first user device comprises:

providing the edge server data that has been aggregated by the network key that is the same as the network key associated with the first user device and identifiers of edge servers to a machine learning model, wherein the machine learning model is trained to identify best edge servers; and receiving, from the machine learning model, an identifier of the best edge server for the first user device.

6. The system of claim 1, wherein selecting a best edge server for the first user device based at least in part on the edge server data that has been aggregated by the network key that is the same as the network key associated with the first user device comprises:

calculating, for each edge server that meets a predetermined minimum probing response success rate, a respective server score; and identifying, as the best edge server, the edge server with a best server score.

7. The system of claim 6, wherein the server score corresponds to the mean round-trip time of the edge server.

8. The system of claim 7, wherein the one or more computer programs on the content platform, when executed by the one or more computers on the content platform, further cause the content platform to perform operations comprising:

obtaining throughput data from each of the plurality of edge servers, the throughput data comprising, for each edge server, a bit rate of the edge server; and adjusting the server scores of the edge servers based on the throughput data.

9. The system of claim 6, wherein the server score corresponds to a sum of the mean round-trip time of the edge server and a standard deviation of the round-trip times of the edge server to user devices associated with the same network key.

10. The system of claim 6, wherein the plurality of other edge servers to which the first user device should send future probing requests comprise a next 30 to 40 highest ranked edge servers based on the server scores of the edge servers.

11. The system of claim 6, wherein the plurality of other edge servers to which the first user device should send future probing requests is determined by:

selecting edge servers from among the edge servers with a server score by a virtual raffle in which each edge server with a server score is assigned a number of raffle tickets that is higher for edge servers with better server scores than other edge servers.

12. The system of claim 1, wherein the one or more computer programs comprise an aggregation computer program and a traffic control computer program, wherein:

the aggregation computer program is configured to perform operations comprising:

obtaining from the user devices the edge server data collected by the user devices, wherein the edge server data that is received from each user device is labeled with device information about the respective user device that provided the edge server data including the network key associated with the respective user device, and aggregating the edge server data by network key; and the traffic control computer program is configured to perform operations comprising:

in response to a polling request received from a requesting user device:

selecting a best edge server for the user device based on the edge server data that has been aggregated by the network key that is the same as the network key associated with the requesting user device, and providing, to the requesting user device, an identifier of the selected best edge server for the requesting user device and identifiers of a plurality other edge servers to which the requesting user device should send future probing requests.

13. A method comprising:

receiving a polling request from a first user device of a plurality of user devices, wherein each user device of the plurality of user devices is configured to access a content platform through one of a plurality of edge servers identified by data on the user device as a best edge server for the user device, wherein each user device is associated with one of a plurality of network keys, and wherein the number of network keys is less than the number of user devices;

obtaining edge server data from the user devices, wherein the edge server data from each user device is labeled with device information about the user device including the network key associated with the user device, wherein the edge server data includes round-trip times that are computed by each user device by:
  sending, by each user device, probing requests to the best edge server for the user device and to a plurality of other edge servers not identified as the best edge server, wherein the plurality of other edge servers were identified to the user device by the content platform in a previous response to a previous probing request from the user device,
  receiving probing responses to the probing requests or noting a lack of response, and
  determining, for each received probing response, a round-trip time, the round-trip time being an amount of time elapsed between a time the user device received the probing response and a time the user device sent the corresponding probing request;
aggregating the edge server data by network key, including:
  determining a number of probing requests that were sent to the edge server by user devices associated with a same network key in a predetermined time window;
  calculating a probing response success rate of the edge server, the probing response success rate being the number of probing responses received by user devices associated with the same network key divided by the number of probing requests sent to the edge server by the user devices; and
  calculating a mean round-trip time of the edge server, the mean round-trip time of the edge server being a mean of the round-trip times determined for the probing responses sent by the edge server and received by the user devices associated with the same network key;
selecting a best edge server for the first user device based at least in part on the edge server data that was aggregated by the network key that is the same as the network key associated with the first user device, and
providing, to the first user device, an identifier of the selected best edge server for the user device and identifiers of a selected plurality other edge servers to which the first user device should send future probing requests; and
wherein the user devices of the plurality of user devices are each configured to request content from and post content to the content platform through the respective edge server that is the selected best edge server for the respective user device.

14. The method of claim 13, wherein the network key associated with each user device comprises (i) a country code of the user device, (ii) an autonomous system number corresponding to an IP address of the user device, and (iii) the first three octets of the IP address of the user device.

15. The method of claim 13, wherein selecting a best edge server for the first user device based at least in part on the edge server data that has been aggregated by the network key that is the same as the network key associated with the first user device comprises:
  calculating, for each edge server that meets a predetermined minimum probing response success rate, a respective server score; and
  identifying, as the best edge server, the edge server with a best server score.

16. The method of claim 15, wherein the server score corresponds to the mean round-trip time of the edge server.

17. The method of claim 16, further comprising:
  obtaining throughput data from each of the plurality of edge servers, the throughput data comprising, for each edge server, a bit rate of the edge server; and
  adjusting the server scores of the edge servers based on the throughput data.

18. The method of claim 15, wherein the server score corresponds to a sum of the mean round-trip time of the edge server and a standard deviation of the round-trip times of the edge server to user devices associated with the same network key.

19. One or more non-transitory computer storage media storing instructions that are operable, when executed by one or more computers, to cause the one or more computers to perform operations comprising:
  receiving a polling request from a first user device of a plurality of user devices, wherein each user device is configured to access a content platform through one of a plurality of edge servers identified by data on the user device as a best edge server for the user device, wherein each user device is associated with one of a plurality of network keys, and wherein the number of network keys is less than the number of user devices;
  obtaining edge server data from the user devices, wherein the edge server data from each user device is labeled with device information about the user device including the network key associated with the user device, wherein the edge server data includes round-trip times that are computed by each user device by:
    sending probing requests to the best edge server for the user device and to a plurality of other edge servers not identified as the best edge server, wherein the plurality of other edge servers were identified to the user device by the content platform in a previous response to a previous probing request from the user device,
    receiving probing responses to the probing requests or noting a lack of response, and
    determining, for each received probing response, a round-trip time, the round-trip time being an amount of time elapsed between a time the user device received the probing response and a time the user device sent the corresponding probing request;
  aggregating the edge server data by network key, including:
    determining a number of probing requests that were sent to the edge server by user devices associated with a same network key in a predetermined time window;
    calculating a probing response success rate of the edge server, the probing response success rate being the number of probing responses received by user devices associated with the same network key divided by the number of probing requests sent to the edge server by the user devices; and
    calculating a mean round-trip time of the edge server, the mean round-trip time of the edge server being a mean of the round-trip times determined for the probing responses sent by the edge server and received by the user devices associated with the same network key;
  selecting a best edge server for the first user device based at least in part on the edge server data that was aggregated by the network key that is the same as the network key associated with the first user device, and
  providing, to the first user device, an identifier of the selected best edge server for the user device and identifiers of a selected plurality of other edge servers to which the first user device should send future probing requests; and wherein the user devices of the plurality of user devices are each configured to request content from and post content to the content platform through the respective edge server that is the selected best edge server for the respective user device.

20. The one or more non-transitory computer storage media of claim 19, wherein the network key associated with each user device comprises (i) a country code of the user device, (ii) an autonomous system number corresponding to an IP address of the user device, and (iii) the first three octets of the IP address of the user device.

21. The one or more non-transitory computer storage media of claim 19, wherein selecting a best edge server for the first user device based at least in part on the edge server data that has been aggregated by the network key that is the same as the network key associated with the first user device comprises:

calculating, for each edge server that meets a predetermined minimum probing response success rate, a respective server score; and identifying, as the best edge server, the edge server with a best server score.

22. The one or more non-transitory computer storage media of claim 21, wherein the server score corresponds to the mean round-trip time of the edge server.

23. The one or more non-transitory computer storage media of claim 22, wherein the operations further comprise:

obtaining throughput data from each of the plurality of edge servers, the throughput data comprising, for each edge server, a bit rate of the edge server; and adjusting the server scores of the edge servers based on the throughput data.

24. The one or more non-transitory computer storage media of claim 21, wherein the server score corresponds to a sum of the mean round-trip time of the edge server and a standard deviation of the round-trip times of the edge server to user devices associated with the same network key.

\* \* \* \* \*